United States Patent
Paetzold

(10) Patent No.: US 12,193,061 B2
(45) Date of Patent: Jan. 7, 2025

(54) CONTENTION BASED RANDOM ACCESS PROCEDURE FOR MOBILE COMMUNICATIONS

(71) Applicant: Deutsche Telekom AG, Bonn (DE)

(72) Inventor: Thomas Paetzold, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 438 days.

(21) Appl. No.: 17/590,832

(22) Filed: Feb. 2, 2022

(65) Prior Publication Data
US 2022/0256608 A1   Aug. 11, 2022

(30) Foreign Application Priority Data

Feb. 6, 2021   (EP) ..................................... 21155647

(51) Int. Cl.
*H04W 74/0833*   (2024.01)
*H04W 74/00*   (2009.01)

(52) U.S. Cl.
CPC ... *H04W 74/0833* (2013.01); *H04W 74/0841* (2013.01); *H04W 74/002* (2013.01)

(58) Field of Classification Search
CPC ........... H04W 74/0833; H04W 74/008; H04W 74/0841
See application file for complete search history.

(56) References Cited

U.S. PATENT DOCUMENTS

| | | | | |
|---|---|---|---|---|
| 11,153,913 | B2* | 10/2021 | Chen | H04W 72/23 |
| 11,172,385 | B2* | 11/2021 | Basu Mallick | H04B 7/088 |
| 2011/0078399 | A1* | 3/2011 | Ueki | H04L 51/212 |
| | | | | 711/E12.098 |
| 2016/0269168 | A1* | 9/2016 | Carstens | E05B 43/005 |
| 2020/0068547 | A1 | 2/2020 | Li et al. | |
| 2020/0374921 | A1* | 11/2020 | Li | H04W 68/005 |
| 2021/0204129 | A1* | 7/2021 | Yang | H04W 74/0833 |

FOREIGN PATENT DOCUMENTS

| | | | |
|---|---|---|---|
| EP | 3627950 A1 | 3/2020 | |
| WO | WO 2019241999 A1 | 12/2019 | |

* cited by examiner

*Primary Examiner* — Mounir Moutaouakil
(74) *Attorney, Agent, or Firm* — LEYDIG, VOIT & MAYER, LTD.

(57) ABSTRACT

A method for a contention-based random access procedure includes: receiving, by a base station, a first scheduled transmission message of a mobile terminal; in response to receiving the first scheduled transmission message, setting up, by the base station, a contention resolution message, wherein the contention resolution message comprises a defined part of a hash value of a mobile terminal contention resolution identity; and transmitting, by the base station, the contention resolution message to the mobile terminal.

10 Claims, 3 Drawing Sheets

CONTENTION BASED RANDOM ACCESS PROCEDURE FOR MOBILE COMMUNICATIONS

CROSS-REFERENCE TO PRIOR APPLICATIONS

This application claims benefit to European Patent Application No. EP 21 155 647.7, filed on Feb. 6, 2021, which is hereby incorporated by reference herein.

TECHNICAL FIELD

The present invention refers to a contention based random access procedure for use in a mobile communication system. The invention also refers to a mobile terminal, e.g. a user equipment, and a base station, e.g. an eNodeB or gNodeB, which are suitably adapted to execute the contention based random access procedure. Furthermore, the invention provides a special format of a contention resolution message signalled during the contention based random access procedure.

BACKGROUND

Both 4G LTE networks and 5G networks offer contention based random access procedures, i.e. the random access procedure implies an inherent risk of collision.

Such a contention based random access procedure is described in more detail with respect to FIG. 1. A detailed description of the random access procedure can be also found in 3GPP TS 36.321 (for 4G) and in 3GPP TS 38.321 (for 5G). FIG. 1 shows the contention based RACH (Random Access Channel) procedure in a 5G network. A similar contention based RACH procedure can be performed in a 4G network. The RACH procedure includes four "steps". First, a mobile terminal, here realized by a user equipment (UE), selects a random access resource, i.e. a PRACH resource, a preamble and the next available subframe, for PRACH transmission and transmits 101 a random access preamble (MSG1) on the Physical Random Access Channel (PRACH) to a base station, e.g. to eNodeB (4G) or gNodeB (5G), depending on which network is used. The random access preamble is selected by the user equipment from a set of available random access preambles reserved by eNodeB (4G) or gNodeB (5G) for contention based random access. In 4G LTE networks as well as in 5G networks, there are 64 preambles per cell which can be used for contention based random access. After eNodeB (4G) or gNodeB (5G) has detected a RACH preamble, it sends 102 a Random Access (RACH) Response (RAR) as MSG2 on the PDSCH (Physical Downlink Shared Channel) addressed on the PDCCH (Physical Downlink Control Channel). If multiple user equipments (UEs) transmitted the same RACH preamble in the same PRACH resource, there is a collision and the respective UEs would receive the same RACH response (MSG2). The RACH response itself comprises the detected RACH preamble, i.e. in the RACH response the preamble is echoed back to the UE, hence the UE knows that it has been "heard" by the eNodeB (4G) or the gNodeB (5G). Due to the limited amount of only 64 preambles, the probability of choosing the same preamble by different UEs accessing the same cell in the very same moment can be high in certain scenarios.

These are the cases when the multiple UEs, which have chosen the same preamble, may also simultaneously react upon single downlink RACH response, sending 103 simultaneously RRC (Radio Resource Channel) Connection Requests (for RRC connection establishment and RRC connection reestablishment) with their UE identities included, on CCCH (Common Control Channel) logical channel, i.e. initial layer 3 message (MSG3) is a CCCH SDU (Server Data Unit). Such a UE identity comprises generally 40 bits and is represented by a random value or by a S-TMSI (Sender-Temporary Mobile Subscriber Identity). In the following, such UE identity is also called user equipment contention resolution identity.

In response to the RACH response received from the eNodeB (4G) or gNodeB (5G), the user equipment transmits 103 a first scheduled (uplink) transmission message (MSG3) on the resources assigned within the RACH response. This first scheduled uplink transmission message comprises the RRC connection request. In case of a preamble collision having occurred, i.e. multiple user equipments have sent the same preamble on the same PRACH resource, the colliding user equipments will also collide in the same uplink resources when transmitting 103 their respective first scheduled transmission message. This may result in interference that no transmission from a colliding user equipment can be decoded at the eNodeB (4G) or the gNodeB (5G), and the user equipments will restart the contention based random access procedure after having reached a given maximum number of retransmission for their scheduled transmission message. In case the scheduled transmission message from one user equipment is successfully decoded by eNodeB (4G) or gNodeB (5G), the contention remains unsolved for the other user equipments.

For resolution of the contention, the eNodeB or gNodeB sends 104 a contention resolution message addressed to the one successful user equipment, and echoes the 40-bit user equipment contention resolution identity contained in the first scheduled transmission message. Only the user equipment which detects its user equipment contention resolution identity continues further data transmission. Other user equipments (UEs) realize that there was a collision at step 101 and can quickly exit the current contention based RACH procedure and starts another one.

Only one of them will be accepted by the network, i.e. by the eNodeB (4G) or the gNodeB (5G) which will be signalled back in a contention resolution message (MSG4) by echoing the accepted UE contention resolution identity, e.g. the 40-bit UE identity. Those other UEs which did not recognize their UE contention resolution identity, have to restart the random access procedure. Contention resolution is, therefore, based upon reception of contention resolution identity MAC CE (Medium Access Control Control Element). In this case, a new CRNTI (Cell Radio Network Temporary Identity) is allocated to the respective UE.

In order to check whether the UE will be accepted by the network, i.e. by the eNodeB (4G) or the gNodeB (5G) (depending on which network is used), the following test is performed on UE side:

If (CCCH SDU was included in MSG3) && If (PDCCH transmission is addressed to its Temporary CRNTI) && If(MAC PDU is successfully decoded) && If(MAC PDU contains a UE Contention Resolution Identity MAC control element)

```
{
    If (UE Contention Resolution Identity included in the MAC control
element == CCCH SDU transmitted in MSG3)
        Then Consider Contention Resolution successful.
    }
```

PDU is an abbreviation for protocol data unit.

The precondition of the check:
UE Contention Resolution Identity included in the MAC control element=CCCH SDU transmitted in MSG3
is that the UE contention resolution identity sent by the UE in MSG3, i.e. in the first scheduled transmission message, is signalled back by echoing the accepted UE contention resolution identity, e.g. the 40-bit UE identity, from the cell, i.e. from the eNodeB or gNodeB, in downlink in MSG4, i.e. in the contention resolution message. Current standards do this exactly 1:1, a fact that could be exploited by malicious UEs, located within the same cell to transfer messages via misusing this feature. This can be happen as follows: If in uplink a UE_A injects a value that is not random but represents each time 5 symbols of a message (corresponding to/representing 40 bits of a UE contention resolution identity) that it wants to transmit, the base station, e.g. eNodeB (4G) or gNodenB (5G), would echo it in downlink on the DL-SCH (Downlink Shared Channel) that could be intercepted by a UE_B to receive the message without leaving any trace on the network. This would be a potential fraud and might consume resources.

SUMMARY

In an exemplary embodiment, the present invention provides a method for a contention-based random access procedure. The method includes: receiving, by a base station, a first scheduled transmission message of a mobile terminal; in response to receiving the first scheduled transmission message, setting up, by the base station, a contention resolution message, wherein the contention resolution message comprises a defined part of a hash value of a mobile terminal contention resolution identity; and transmitting, by the base station, the contention resolution message to the mobile terminal.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
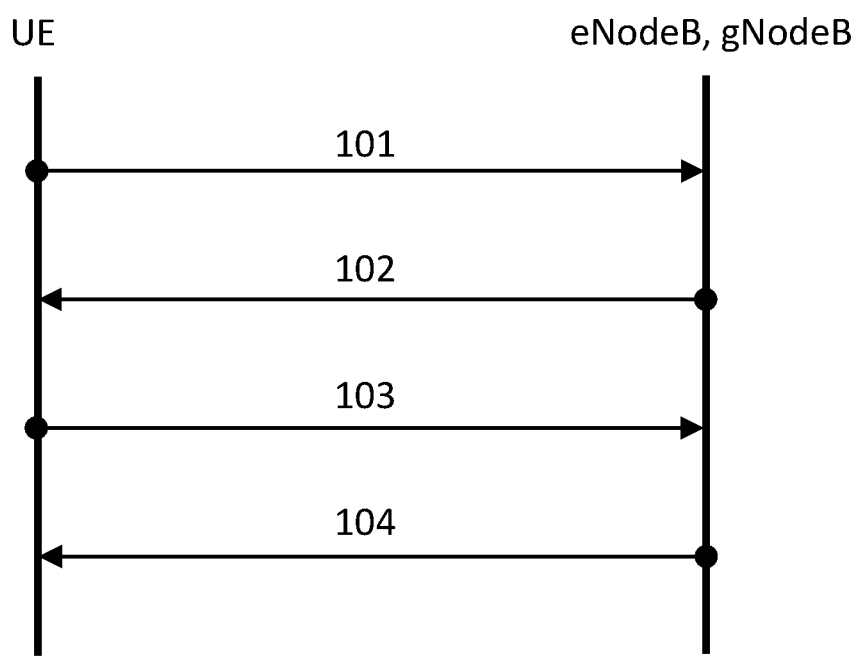
FIG. 1 shows a schematic diagram illustrating a contention based random access procedure according to the state of the art.

Exemplary embodiments of the present invention provide the capability to prevent the above-discussed kind of misuse in a contention based random access procedure.

According to one first aspect, the present disclosure refers to a contention resolution message for transmission from a base station to a mobile terminal, e.g. a user equipment, in a contention based random access procedure, wherein the contention resolution message is setup in response to receiving a first scheduled transmission message of a mobile terminal and comprises a defined part of a hash value of a mobile terminal contention resolution identity, in the following also called user equipment contention resolution identity.

In a 4G network, the base station may be represented by a eNodeB, in a 5G network, the base station may be represented by a gNodeB. The mobile terminal may be represented by a user equipment (UE). Within the scope of the present disclosure, the terms "mobile terminal" and "user equipment" and "UE" are used synonymously. Within the scope of the present disclosure, the terms "mobile terminal contention resolution identity" and "user equipment contention resolution identity" and "UE contention resolution identity" and "UE CRI" are used synonymously.

In one embodiment of the contention resolution message, the user equipment contention resolution identity is taken from the first scheduled transmission message which comprises the user equipment contention resolution identity included in a MAC control element.

According to a further embodiment, the hash value is calculated by the base station using a hash algorithm. The hash algorithm is public and particularly also known to the user equipment. The hash algorithm is known to all UEs which are requesting to have access to the same cell. The hash algorithm may be SHA-256.

According to a further embodiment of the contention resolution message, the defined part of the hash value of the user equipment contention resolution identity has the same size as the user equipment contention resolution identity. Particularly in the case of a defined size of 40 bits of the user equipment contention resolution identity, the defined part of the hash value only has the 40 least significant bits of the hash value of the user equipment contention resolution identity.

The UE contention resolution identity is a temporary UE identity which is used only in the contention resolution procedure, i.e. in order to check whether the UE sending the first scheduled transmission message including said UE contention resolution identity is accepted by the base station. In case that the base station sends back a contention resolution message including a defined part of a hash value of said UE contention resolution identity, the respective UE can verify that the contention resolution was successful. Due to the hashing procedure, only the accepted UE is able to verify its contention resolution identity. To do this, the UE itself calculates an own hash value of its contention resolution identity and compares the own hash value with the hash value calculated by the base station. It compares a part of the own hash value which corresponds (regarding size and position) to the defined part of the hash value with the defined part of the hash value, i.e. it checks whether the respective bit-values are identical.

According to a second aspect, the present disclosure refers to a random access procedure for use in a mobile communication system. In this random access procedure a base station transmits a contention resolution message in response to receiving a first scheduled transmission message from a mobile terminal, wherein the contention resolution message comprises a defined part of a hash value of a user equipment contention resolution identity, the user equipment contention resolution identity being included in a MAC control element of the first scheduled transmission message.

In a further embodiment of the invention, as part of the random access procedure the mobile terminal transmits said first scheduled transmission message as MSG3 to the base station. Following the "4 step"-format of a known random access procedure, the random access procedure according to an embodiment of the invention also provides that the mobile terminal, i.e. the user equipment (UE), transmits said first scheduled transmission message as MSG3 in reaction to receiving a Random Access (RACH) Response as MSG2 on the PDSCH (Physical Downlink Shared Channel) addressed on the PDCCH (Physical Downlink Control Channel) which has been transmitted by the base station in reaction to random access preamble transmission as MSG1 from the mobile terminal. Generally, according to the "4 step" format of a random access procedure as mentioned before, in a first step, the mobile terminal selects a random access resource, i.e. a PRACH resource, a preamble and the next available subframe, for PRACH transmission and transmits a random access preamble on the Physical Random Access Channel (PRACH) to a eNodeB (4G) or gNodeB (5G). The random access preamble is selected by the user equipment from a set of available random access preambles reserved by eNodeB (4G) or gNodeB (5G) for contention based random access. In 4G LTE networks as well as in 5G networks, there are 64 preambles per cell which can be used for contention based random access. After eNodeB (4G) or gNodeB (5G) has detected a RACH preamble, it sends in a second step a Random Access (RACH) Response on the PDSCH (Physical Downlink Shared Channel) addressed on the PDCCH (Physical Downlink Control Channel).

In still a further embodiment of the random access procedure, the random access procedure further comprises the step of calculating by the base station the hash value of the user equipment contention resolution identity, using a hash algorithm. The hash algorithm is a public hash algorithm, such as SHA-256. However, any other kind of hash algorithm suitable for the random access procedure can be used.

As a further part of the random access procedure, the mobile terminal receives the contention resolution message from the base station and calculates an own hash value of the user equipment contention resolution identity included in the first scheduled transmission message, using the same hash algorithm as has been used by the base station. The mobile terminal further checks an identity between the user equipment contention resolution identity and said one encoded in the hash value calculated by the base station by comparing the defined part of the hash value calculated by the base station with a corresponding defined part of the calculated own hash value. In the case, for example, that the defined part of the hash value corresponds to the 40 least significant bits of the hash value, the corresponding defined part of the own hash value also corresponds to the 40 least significant bits of the own hash value.

According to still another embodiment of the random access procedure, the contention resolution message is a contention resolution message as described hereinbefore.

In a third aspect of the present invention, a base station for performing a random access procedure in a mobile communication system is provided wherein the base station comprises:
- a receiver for receiving a first scheduled transmission message from a mobile terminal, wherein the first scheduled transmission message comprises a user equipment contention resolution identity, particularly included in a MAC control element, and
- a transmitter for transmitting a contention resolution message in response to receiving the first scheduled transmission message, wherein the contention resolution message comprises a defined part of a hash value of the user equipment contention resolution identity, and
- a calculating unit for calculating the hash value of the user equipment contention resolution identity, using a hash algorithm, and for extracting the defined part of the hash value.

In a fourth aspect, the invention provides a mobile terminal for performing a random access procedure in a mobile communication system, which comprises:
- a transmitter for transmitting a first scheduled transmission message to a base station, wherein the first scheduled transmission message comprises a user equipment contention resolution identity, particularly included in a MAC control element,
- a receiver for receiving a contention resolution message from the base station in response to the first scheduled transmission message wherein the contention resolution message comprises a defined part of a hash value of a user equipment contention resolution identity, the hash value being calculated using a hash algorithm,
- a calculating unit for calculating an own hash value of the user equipment contention resolution identity, using the hash algorithm, and for identifying a part of the own hash value which corresponds to the defined part of the hash value, and
- a comparing unit for comparing the corresponding part of the own hash value with the defined part of the hash value of the contention resolution message.

In a fifth aspect, the present invention refers to a system comprising at least one mobile terminal as described herein and at least one base station as described herein, wherein the system is configured to execute a random access procedure as described herein.

In a sixth aspect, the present invention provides a computer program product with a computer-readable medium and a computer program stored on the computer-readable medium with program coding that is configured to execute a random access procedure described hereinbefore when the computer program is run on at least one computer unit, particularly as a component of a system as described hereinabove. The computer program may be running partly on at least one computer unit of the base station and partly on at least one computer unit of the mobile terminal such that in total the above random access procedure may be executed.

The embodiments of the present invention may also be used with relay nodes, even if throughout the present disclosure only contention based random access procedures in a cell that is under the control of a base station are mentioned. The above described embodiments of the invention may be implemented using hardware and/or software. The various embodiments of the invention are implemented or executed using computing units, i.e. processors. Such a computing unit may be a general purpose computer, an application specific integrated circuit (ASIC), a digital signal processor (DSP), a field programmable gate array (FPGA) or another programmable logic device or a combination thereof. The various embodiments of the invention may also be implemented via software modules, which are executed by at least one computing device. The various embodiments of the invention may also be realized by a combination of software modules and a hardware implementation. The software modules may be stored on any kind of computer readable storage medias, for example, flash memory, EPROM, EEPROM, RAM, hard disks, CD-ROM, DVD, etc.

The following description is presented to enable any person skilled in the art to make, use and/or practice the disclosed subject matter, and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations, but is to be accorded the widest scope consistent with the principles and features disclosed herein.

The details of one or more implementations of the subject matter of this specification are set forth in the accompanying drawings and the description. Other features, aspects, and advantages of the subject matter will become apparent from the description, the drawings, and the claims.

FIG. 1 shows schematically a schematic diagram illustrating a contention based random access procedure according to the state of the art and has already been described hereinbefore.

Figure 2:
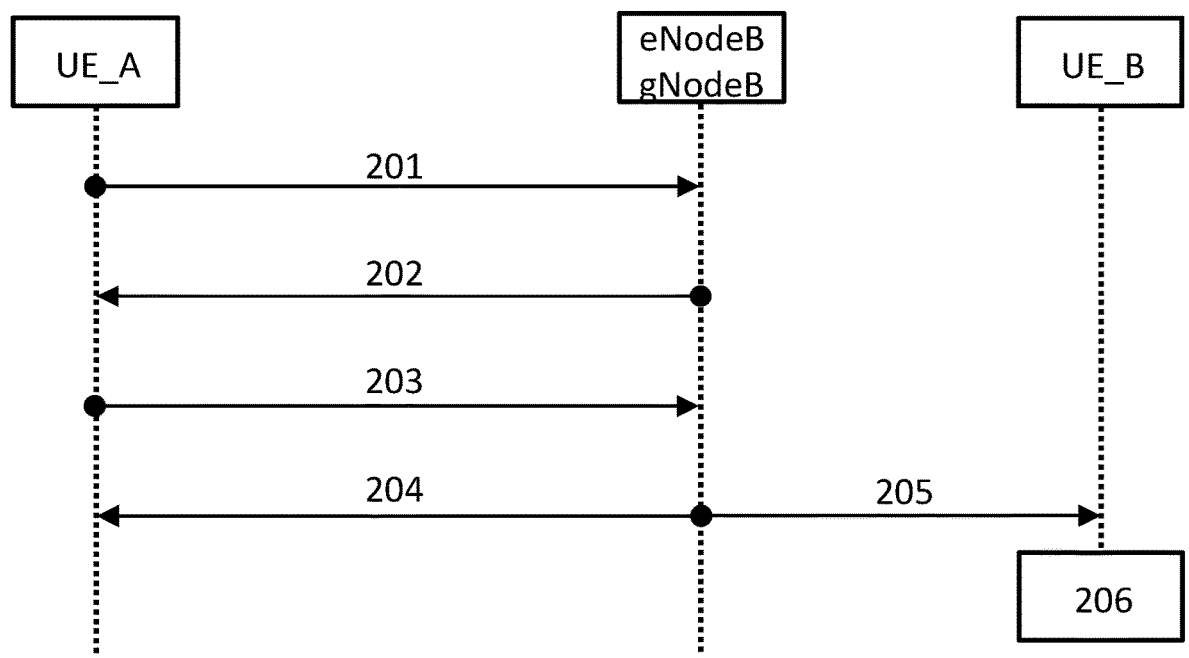
FIG. 2 shows a schematic diagram illustrating a contention based random access procedure according to the state of the art and indicating a potential misuse scenario.

FIG. 2 shows a schematic diagram illustrating a contention based random access procedure according to the state of the art and indicating a potential misuse scenario.

FIG. 2 shows the contention based RACH (Random Access Channel) procedure in a 5G network. A similar contention based RACH procedure can be performed in a 4G network. The RACH procedure includes, as already shown in FIG. 1, four "steps". First, a mobile terminal, here realized by UE_A, selects a random access resource, i.e. a PRACH resource, a preamble and the next available subframe, for PRACH transmission and transmits 201 a random access preamble as MSG1 on the Physical Random Access Channel (PRACH) to eNodeB (4G) or gNodeB (5G). After eNodeB (4G) or gNodeB (5G) has detected a RACH preamble, it sends 202 a Random Access (RACH) Response as MSG2 on the PDSCH (Physical Downlink Shared Channel) addressed on the PDCCH (Physical Downlink Control Channel). If multiple user equipments transmitted the same RACH preamble in the same PRACH resource, there is a collision and the respective user equipments would receive the same RACH response. The RACH response itself comprises the detected RACH preamble, i.e. in the RACH response the preamble is echoed back to the UE_A, hence the UE_A knows that it has been "heard" by the eNodeB (4G) or the gNodeB (5G).

UE_A reacts upon single downlink RACH response by sending 203 a first scheduled (uplink) transmission message as MSG3 which comprises a RRC (Radio Resource Channel) Connection Request (for RRC connection establishment and RRC connection reestablishment) with its UE contention resolution identity MAC CE included, as MSG3 on CCCH (Common Control Channel) logical channel. Such a UE identity, i.e. UE contention resolution identity, comprises generally 40 bits and is represented by a random value or by S-TMSI (Sender-Temporary Mobile Subscriber Identity).

In case the first scheduled transmission message from UE_A is successfully decoded by eNodeB (4G) or gNodeB (5G), for resolution of the contention, the eNodeB or gNodeB (5G) sends 204 a contention resolution message addressed to UE_A, and echoes the UE contention resolution identity, e.g. the 40-bit user equipment identity contained in the first scheduled transmission message (MSG3).

The precondition of checking whether the request was successful is that the UE contention resolution identity sent by the UE_A in MSG3 is signalled back by echoing the accepted contention resolution identity, e.g. the accepted 40-bit UE identity, from the cell, i.e. from the eNodeB or gNodeB, in downlink in MSG4. Current standards do this exactly 1:1, a fact that could be exploited by malicious UEs, such as UE_B, located within the same cell to transfer messages via misusing this feature. This can happen as follows: If in uplink the UE_A injects a value that is not random but represents each time 5 symbols of a message (corresponding to/representing 40 bits of a UE identity) that it wants to transmit, eNodeB (4G) or gNodeB (5G) would echo it in downlink on the DL-SCH (Downlink Shared Channel) that could be intercepted 205 by UE_B to receive the message without leaving any trace on the network. This means that UE_B can collect 206 the symbols of the message. Thus, UE_A and UE_B can communicate without being accepted and registered by the network. This would be a potential fraud and might consume resources.

Figure 3:
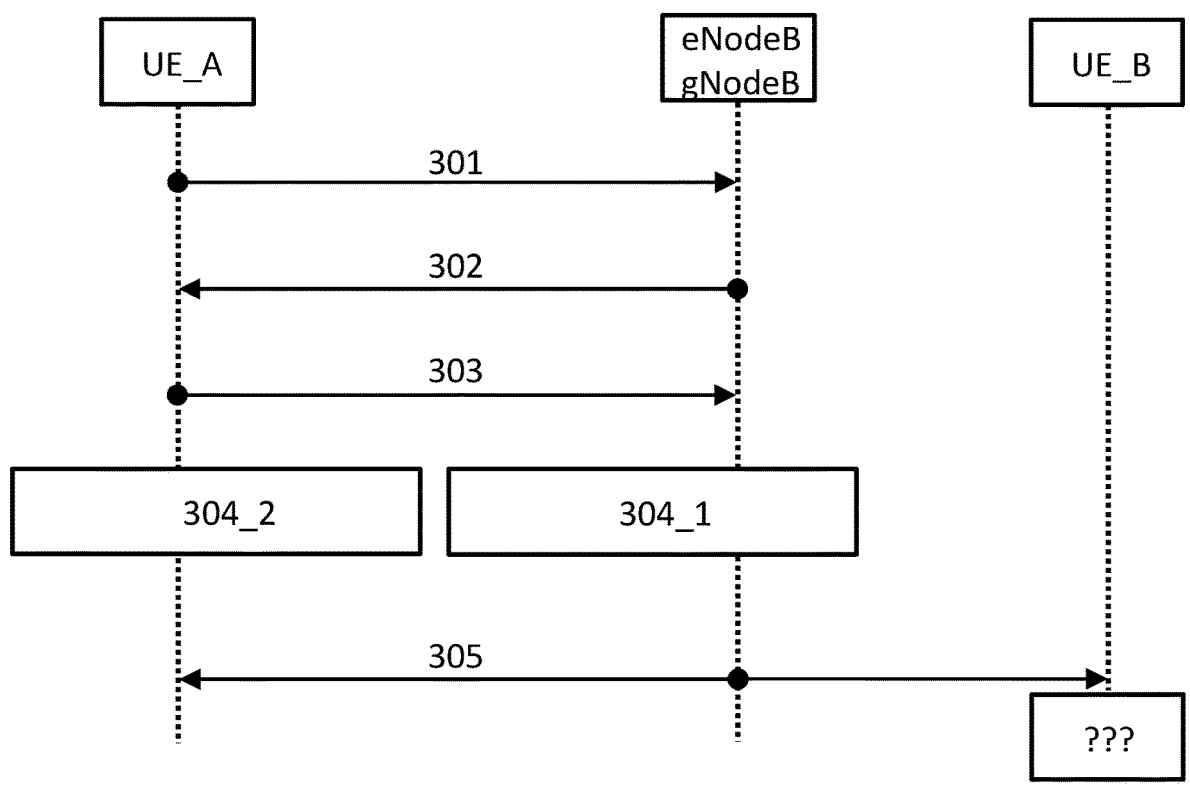
FIG. 3 shows a schematic diagram illustrating an embodiment of a contention based random access procedure according to the present invention which is executed, using an embodiment of a system according to the present invention.

FIG. 3 shows a schematic diagram illustrating a contention based random access procedure according to the present invention. The respective format of the messages MSG1, MSG2 and MSG3 which are transferred in steps 301, 302 and 303 between the UE_A and the eNodeB (4G) or gNodeB (5G) correspond to the respective format of MSG1, MSG2, and MSG3 which are transferred in FIG. 1 in steps 101, 102, and 103, respectively, and in FIG. 2 in steps 201, 202, and 203, respectively. However, the contention resolution message which is sent 305 as MSG4 from the base station, i.e. eNodeB (4G) or gNodeB (5G), to the mobile terminal UE_A differs from MSG4 as transferred in step 104 of FIG. 1 or in step 204 of FIG. 2. The base station does not echo the UE contention resolution identity, e.g. the 40-bit UE identity, 1:1. Rather, in step 304_1, the base station, i.e. eNodeB (4G) or gNodeB (5G), calculates a hash value of the UE contention resolution identity, using a hash algorithm, such as SHA-256, and inserts a defined part of the hash value, e.g. its 40 least significant bits in the downlink contention resolution message MSG4 305. Afterwards the contention resolution message 305 is transferred to the mobile terminal UE_A. The UE_A calculates itself in step 304_2 an own hash value using the same hash algorithm as well and performs a modified check, such as:

---

{
If (UE Contention Resolution Identity included in the MAC control element == 40 least significant bits(HASH(CCCH SDU transmitted in MSG3))
   Then Consider Contention Resolution successful.
}

---

That means that UE_A compares the defined part of the hash value received from the base station, e.g. eNodeN (4G) or gNodeB (5G), with a corresponding defined part of its own hash value, e.g. UE_A compares the least 40 significant bits of the hash value calculated by the base station with the least 40 significant bits of its own hash value. In the case that UE_A states identity, UE_A concludes that the contention resolution was successful and that it is accepted by the base station for transmitting further data within/via the respective cell of the base station. The calculation of the own hash value using the same hash algorithm in step 304_2 can be performed by UE_A at any time between transmitting the first scheduled transmission message 303 and the above mentioned check, i.e. after receiving the contention resolution message 305. It is also possible to do this calculation on the side of UE_A when the UE contention resolution identity is created and/or when the first scheduled transmission message 303 is created.

By that, a "normal" UE_B which did not recognize its UE contention resolution identity, would restart the random access procedure; a malicious UE_B would not be able to reconstruct, as indicated by "???", the input of the UE_A, i.e. the UE contention resolution identity, rendering the misuse pointless and thus mitigating the attack/misuse.

Herein, the (step of) transmission of a respective message and the respective message itself are designated with the same reference sign, e.g. the contention resolution message including a defined part of a hash value of a mobile terminal contention resolution identity and the transmission of said contention resolution message are both designated with the reference sign 305. The same applies accordingly to the other messages.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

UE user equipment, mobile terminal
UE_A user equipment, mobile terminal
UE_B user equipment, mobile terminal
eNodeB base station (4G)
gNodeB base station (5G)
101 random access preamble transmission, MSG1
102 random access response, MSG2
103 first scheduled (uplink) transmission, MSG3
104 contention resolution, MSG4
201 random access preamble transmission, MSG1
202 random access response, MSG2
203 first scheduled (uplink) transmission, MSG3
204 contention resolution, MSG4
205 interception by UE_B
206 collection of symbols by UE_B
301 random access preamble transmission, MSG1
302 random access response, MSG2
303 first scheduled (uplink) transmission, MSG3
304_1 calculation of hash(UE contention resolution identity)
304_2 calculation of own hash(UE contention resolution identity)
305 contention resolution, MSG4, with hashed CRI MAC CE

The invention claimed is:

1. A method for a contention-based random access procedure, comprising:
receiving, by a base station, a first scheduled transmission message of a mobile terminal, wherein the first scheduled transmission message comprises a medium access control (MAC) control element including a mobile terminal contention resolution identity;
in response to receiving the first scheduled transmission message, setting up, by the base station, a contention resolution message, wherein the base station is an eNodeB of a 4G LTE network, wherein the contention resolution message is configured for transmission from the base station to the mobile terminal, wherein the contention resolution message comprises a defined part of a hash value of the mobile terminal contention resolution identity, wherein the hash value of the mobile terminal contention resolution identity is calculated by the base station using a hash algorithm, and wherein the defined part of the hash value is inserted by the base station into the contention resolution message; and
transmitting, by the base station, the contention resolution message to the mobile terminal.

2. The method of claim 1, wherein the hash algorithm is public and known to the mobile terminal.

3. The method of claim 1, wherein the hash algorithm is SHA-256.

4. The method according to claim 1, wherein the defined part of the hash value of the mobile terminal contention resolution identity has the same size as the mobile terminal contention resolution identity.

5. The method of claim 1, wherein the mobile terminal contention resolution identity has a defined size of 40 bits, and the defined part of the hash value has the 40 least significant bits of the hash value of the mobile terminal contention resolution identity.

6. A non-transitory processor readable medium having stored thereon processor executable instructions, wherein the processor-executable instructions, when executed, facilitate performance of the method according to claim 1.

7. A mobile communication system, comprising:
a mobile terminal; and
a base station, wherein the base station is an eNodeB of a 4G LTE network, and wherein the base station is configured to;
receive a first scheduled transmission message of a mobile terminal, wherein the first scheduled transmission message comprises a medium access control (MAC) control element including a mobile terminal contention resolution identity;
in response to receiving the first scheduled transmission message, set up a contention resolution message, wherein the contention resolution message is configured for transmission from the base station to the mobile terminal, wherein the contention resolution message comprises a defined part of a hash value of the mobile terminal contention resolution identity, wherein the hash value of the mobile terminal contention resolution identity is calculated by the base station using a hash algorithm, and wherein the defined part of the hash value is inserted by the base station into the contention resolution message; and
transmit the contention resolution message to the mobile terminal.

8. The mobile communication system according to claim 7, wherein the mobile terminal is configured to:
receive the contention resolution message from the base station;
calculate its own hash value of the mobile terminal contention resolution identity included in the first scheduled transmission message using the hash algorithm; and
check the mobile terminal contention resolution identity corresponding to the hash value calculated by the base station by comparing the defined part of the hash value calculated by the base station with a corresponding defined part of the hash value calculated by the mobile terminal.

9. A base station for performing a contention-based random access procedure in a mobile communication system, wherein the base station is an eNodeB of a 4G LTE network, and wherein the base station comprises:
a receiver configured to receive a first scheduled transmission message from a mobile terminal, wherein the first scheduled transmission message includes a medium access control (MAC) control element comprising a mobile terminal contention resolution identity;
a processor configured to set up a contention resolution message in response to receiving the first scheduled transmission message, wherein the contention resolution message is configured for transmission from the base station to the mobile terminal, wherein the contention resolution message comprises a defined part of a hash value of the mobile terminal contention resolution identity, wherein the hash value of the mobile terminal contention resolution identity is calculated by the base station using a hash algorithm, and wherein the defined part of the hash value is inserted by the base station into the contention resolution message; and
a transmitter configured to transmit the contention resolution message to the mobile terminal.

10. A mobile terminal for performing a contention-based random access procedure in a mobile communication system, comprising:
a transmitter configured to transmit a first scheduled transmission message to a base station, wherein the base station is an eNodeB of a 4G LTE network, and wherein the first scheduled transmission message comprises a medium access control (MAC) control element including a mobile terminal contention resolution identity;
a receiver configured to receive a contention resolution message from the base station, wherein the contention resolution message comprises a defined part of a hash value of the mobile terminal contention resolution identity calculated by the base station; and
a processor configured to:
calculate its own hash value of the mobile terminal contention resolution identity;
identify a part of the own hash value which corresponds to the defined part of the hash value calculated by the base station; and
check the mobile terminal contention resolution identity corresponding to the hash value calculated by the base station by comparing the defined part of the hash value calculated by the base station with the corresponding defined part of the hash value calculated by the mobile terminal.

* * * * *